(12) United States Patent
Jeon

(10) Patent No.: US 9,924,307 B2
(45) Date of Patent: Mar. 20, 2018

(54) TERMINAL FOR PERFORMING POSITION MEASUREMENT AND OPERATING METHOD THEREOF

(71) Applicant: SK Planet Co., Ltd., Seongnam-si, Gyeonggi-do (KR)

(72) Inventor: Jin Ho Jeon, Seoul (KR)

(73) Assignee: SK Planet Co., Ltd., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/074,793

(22) Filed: Mar. 18, 2016

(65) Prior Publication Data

US 2016/0277883 A1    Sep. 22, 2016

(51) Int. Cl.
   *H04W 24/00*    (2009.01)
   *H04W 4/02*     (2018.01)
   *H04W 52/02*    (2009.01)

(52) U.S. Cl.
   CPC ......... *H04W 4/02* (2013.01); *H04W 52/0209* (2013.01); *Y02B 60/50* (2013.01)

(58) Field of Classification Search
   CPC ............. H04W 52/143; H04W 52/146; H04W 52/244; H04W 52/367; H04W 92/20; H04W 52/0206; H04W 52/0225; H04W 52/283; H04W 52/322
   USPC ....... 455/522, 501, 571, 574, 524, 437, 457, 455/456.1, 456.5, 413, 566, 556.1, 422.1
   See application file for complete search history.

(56) References Cited

U.S. PATENT DOCUMENTS

| | | | | |
|---|---|---|---|---|
| 5,774,829 A * | 6/1998 | Cisneros | ................. | G01S 5/145 342/457 |
| 6,067,045 A * | 5/2000 | Castelloe | ................. | G01S 5/02 342/357.43 |
| 8,009,227 B2 * | 8/2011 | Duncan | ................. | H04N 5/232 348/333.13 |
| 8,948,805 B2 * | 2/2015 | Sankar | ................. | H04W 52/325 370/315 |
| 2002/0132621 A1 * | 9/2002 | Takano | ................. | H04W 36/18 455/437 |
| 2004/0152485 A1 * | 8/2004 | Deeds | ................. | H04N 1/00127 455/556.1 |
| 2008/0062925 A1 * | 3/2008 | Mate | ................. | H04W 52/244 370/331 |
| 2008/0075027 A1 * | 3/2008 | Lee | ................. | H04W 52/28 370/311 |
| 2009/0093246 A1 * | 4/2009 | Czaja | ................. | H04W 52/343 455/422.1 |

(Continued)

FOREIGN PATENT DOCUMENTS

JP    2008-125940    * 11/2009    ............ H04W 52/02

*Primary Examiner* — Joseph Arevalo
(74) *Attorney, Agent, or Firm* — Hauptman Ham, LLP

(57) ABSTRACT

This specification discloses a terminal which performs position measurement and an operating method of the terminal. That is, a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement is minimized and the accuracy of the position measurement is improved.

4 Claims, 11 Drawing Sheets

(56) References Cited

U.S. PATENT DOCUMENTS

| | | | |
|---|---|---|---|
| 2009/0286578 A1* | 11/2009 | Nagasawa | H04W 52/0277 455/574 |
| 2010/0069111 A1* | 3/2010 | Senba | H04L 1/0028 455/522 |
| 2010/0323745 A1* | 12/2010 | Chen | H04W 52/325 455/522 |
| 2011/0117938 A1* | 5/2011 | Pyo | G01S 5/0072 455/457 |
| 2011/0148699 A1* | 6/2011 | Anderson | G01S 19/34 342/357.31 |
| 2012/0019210 A1* | 1/2012 | Wakamatsu | H01M 10/425 320/134 |
| 2012/0028652 A1* | 2/2012 | Wirola | G01S 5/0252 455/456.1 |
| 2012/0088538 A1* | 4/2012 | Wallen | H04W 52/16 455/522 |
| 2012/0094702 A1* | 4/2012 | Furueda | H04W 72/02 455/501 |
| 2012/0172045 A1* | 7/2012 | Fukuta | H04W 36/32 455/440 |
| 2013/0044680 A1* | 2/2013 | Abraham | H04W 16/14 370/328 |
| 2013/0044681 A1* | 2/2013 | Abraham | H04L 1/0002 370/328 |
| 2013/0090147 A1* | 4/2013 | Yamazaki | H04W 52/0225 455/522 |
| 2013/0148517 A1* | 6/2013 | Abraham | H04B 7/12 370/252 |
| 2013/0244692 A1* | 9/2013 | Kelly | H04W 4/02 455/456.1 |
| 2014/0111375 A1* | 4/2014 | Beauregard | G01S 13/82 342/357.42 |
| 2014/0180968 A1* | 6/2014 | Song | G01D 4/004 705/412 |
| 2014/0293949 A1* | 10/2014 | Kim | H04W 16/14 370/329 |
| 2015/0364080 A1* | 12/2015 | Lee | G09G 3/3216 345/211 |
| 2016/0054428 A1* | 2/2016 | Eldic | H04B 17/27 455/574 |
| 2016/0159241 A1* | 6/2016 | Ueda | B60L 11/1846 701/22 |
| 2016/0165549 A1* | 6/2016 | Zhang | H04W 52/243 370/329 |
| 2016/0381644 A1* | 12/2016 | Forrester | H04W 52/146 370/311 |

* cited by examiner

TERMINAL FOR PERFORMING POSITION MEASUREMENT AND OPERATING METHOD THEREOF

CROSS-REFERENCE TO RELATED APPLICATION

This application is based upon and claims the benefit of priority from Korean Patent Application No. 10-2015-0037272, filed on Mar. 18, 2015, the entire contents of which are incorporated herein by reference.

BACKGROUND OF THE INVENTION

1. Field of the Invention

The present invention relates to a technique for determining a specific positioning area, to which the terminal belongs, out of two or more positioning areas, to which different positioning methods are assigned, and performing position measurement by the terminal according to the positioning method which is assigned to the specific positioning area.

2. Description of the Related Art

A position based service is a service of identifying a position of a terminal and providing differentiated services by considering the identified position.

This position based service can be realized by enabling a service client, which operates in the background of the terminal in a form of a program or an application, to measure the position of the terminal at a preset period or when necessary, and report the measured position to a subject of the service.

By the way, in the position based service, it can happen that the position of the terminal is requested too frequently, and, in this case, the service client is entitled to measure the position of the terminal whenever the request is received, which aggravates a problem of accelerating the battery consumption speed of the terminal.

SUMMARY OF THE INVENTION

The present invention has been envisaged by considering the aforementioned situation, and an objective to be achieved by the present invention is to minimize the power consumption amount of the terminal for performing the position measurement and improving the accuracy of the position measurement by determining a specific positioning area, to which the terminal belongs, out of a plurality of positioning areas, to which different positioning methods are assigned, then performing the position measurement by the terminal according to the positioning method which is assigned to the specific positioning area.

The terminal according to a first aspect of the present invention is characterized in comprising: a determining unit which, when a position measurement is required, determines a specific positioning area, to which the terminal belongs, out of two or more positioning areas to which different positioning methods are assigned; and a measuring unit which, when the specific positioning area is determined, performs position measurement according to the positioning method which is assigned to the specific positioning area.

More specifically, the terminal is characterized in that different positioning methods are assigned to each of the two or more positioning areas based on at least one of a power consumption amount of the terminal required for the position measurement and the accuracy required for the position measurement.

More specifically, the terminal is characterized in that the position measurement is performed based on a battery remaining amount of the terminal.

More specifically, The terminal is characterized in that the measuring unit performs the position measurement according to the positioning method which is assigned to the specific positioning area, when the battery remaining amount of the terminal is greater than or equal to a threshold value.

More specifically, the terminal is characterized in that, when the battery remaining amount is smaller than the threshold value, the measuring unit performs the position measurement according to a specific positioning method, which consumes a smallest power consumption amount, among the positioning methods which are assigned to the two or more positioning areas, irrespective of the positioning method which is assigned to the specific positioning area.

Also, the operating method of a terminal according to a second aspect of the present invention is characterized in comprising: a determining step in which, when a position measurement is required, a specific positioning area, to which the terminal belongs, is determined out of two or more positioning areas to which different positioning methods are assigned; and a measuring step in which, when the specific positioning area is determined, position measurement is performed according to the positioning method which is assigned to the specific positioning area.

More specifically, the terminal is characterized in that different positioning methods are assigned to each of the two or more positioning areas based on at least one of a power consumption amount of the terminal required for the position measurement and the accuracy required for the position measurement.

More specifically, the operating method of a terminal is characterized in that the position measurement is performed based on a battery remaining amount of the terminal.

More specifically, the operating method of a terminal is characterized in that, in the measuring step, the position measurement is performed according to the positioning method which is assigned to the specific positioning area, when the battery remaining amount of the terminal is greater than or equal to a threshold value.

More specifically, the operating method of a terminal is characterized in that, in the measuring step, when the battery remaining amount is smaller than the threshold value, the position measurement is performed according to a specific positioning method, which consumes a smallest power consumption amount, among the positioning methods which are assigned to the two or more positioning areas, irrespective of the positioning method which is assigned to the specific positioning area.

Therefore, according to the terminal for performing position measurement and an operating method of the terminal according to the present invention, a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement can be minimized and the accuracy of the position measurement can be improved.

DETAILED DESCRIPTION OF THE INVENTION

Figure 1:
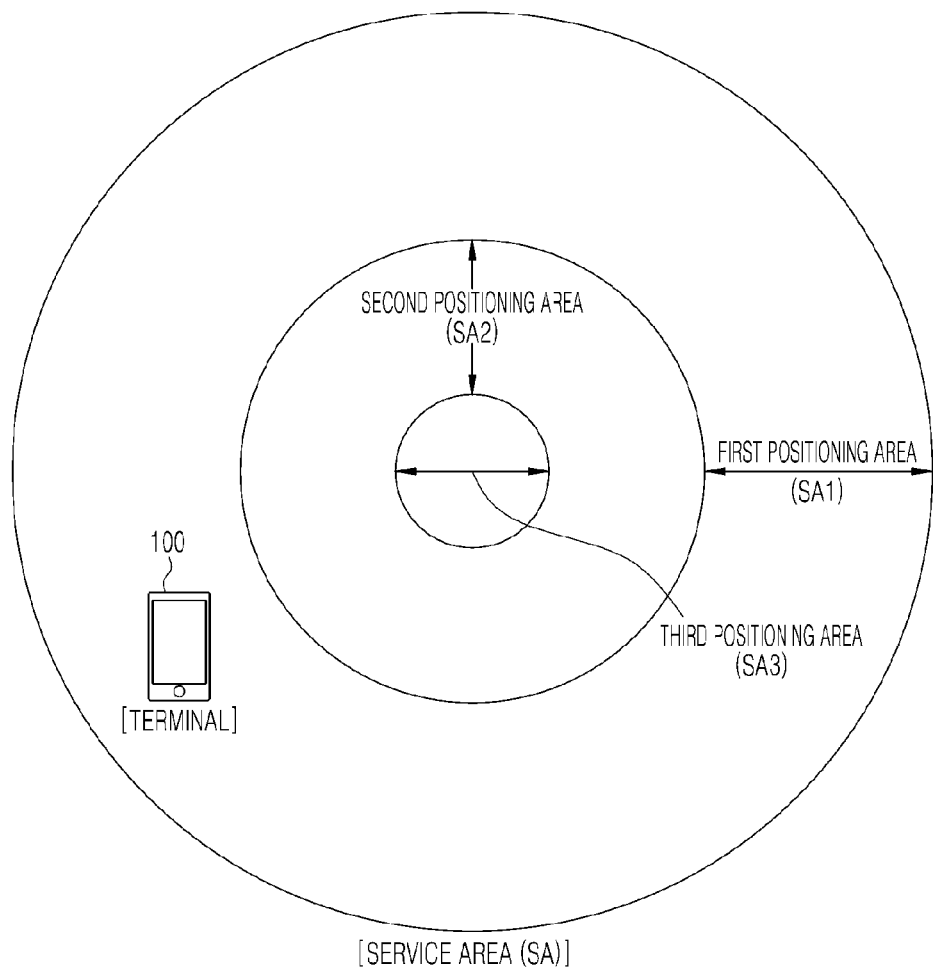
FIG. 1 is a schematic configuration diagram of a position based service environment according to an embodiment of the present invention.

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The term "include" or "is composed of" in this specification is not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Here, one embodiment of the present invention is described by referring to the appended figures.

FIG. 1 is a diagram which shows a service environment in which the position measurement according to an embodiment of the present invention is performed.

As shown in FIG. 1, service areas (SA) in which the position based service can be utilized, as well as a terminal 100 which measures its position within the service areas (SA) can be included in the position based service environment.

The service areas (SA) refer to an area in which a user carrying the terminal 100 can travel, and the areas are not limited by an area size when electromagnetic signals for the position based service can be received within the service areas.

The terminal 100 refers to a device which, when position acknowledgement is required in relation to the position based service, measures its position within the service area (SA) and delivers the acknowledged position to a subject of the service (for example: a service server which is not shown in the figures).

For example, a mobile device including a smart phone, a tablet personal computer (PC), a personal digital assistant (PDA), and a notebook, etc. can be the terminal 100; however, the terminal 100 is not limited to these examples and all devices capable of position measurement can be included in the terminal.

Meanwhile, according to an embodiment of the present invention, the terminal 100 measures its position within a service area (SA), delivers the measured position to the subject of the service (not shown in the figures), and then receives the position based service.

As shown in the background of the invention section, the position based service as mentioned above can be realized, for example, by enabling a service client, which operates in the background of the terminal in a form of a program or an application, to measure the position of the terminal at a preset period or when necessary, and report the measured position to a subject of the service.

Like this, the most important factor for the service, which is provided by acknowledging the position of the terminal 100, is to acknowledge an accurate position of the terminal 100, and, in order to accomplish this, the terminal 100 is required to acknowledge its position at a short period and report the acknowledged position to the subject of the service.

By the way, when the terminal 100 acknowledges its position and reports the acknowledged position at a short period as described in the above, the accuracy of the position based service is improved; however, it has a drawback that the battery consumption of the terminal 100 can be accelerated.

In particular, in the case where the terminal 100 frequently acknowledges its position by using a global positioning system (GPS) based positioning method, which consumes much battery power, it can be estimated that the battery consumption will be further accelerated.

As a result, in order to provide a preferable position based service, there is required a new solution which can minimize the power consumption amount required for performing the position measurement of the terminal 100 and also improve the accuracy of the position measurement.

Therefore, an embodiment of the present invention aims at providing a technique which can minimize the power consumption amount required for performing the position measurement of the terminal 100 while improving the accuracy of the position measurement at the same time, and the terminal 100, which is provided to realize the embodiment of the present invention, will be explained in detail in the following.

At first, the configuration of the terminal 100 according to an embodiment of the present invention will be explained in detail by referring to FIG. 2.

Figure 2:
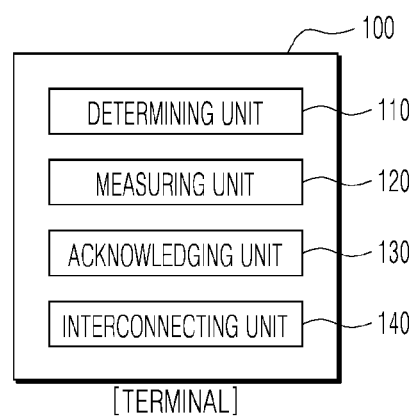
FIG. 2 is a schematic configuration diagram of a terminal according to an embodiment of the present invention.

As shown in FIG. 2, the terminal 100 can have a configuration comprising a determining unit 110, which determines a positioning area to which the terminal 100 belongs, and a measuring unit 120 which measures the position according to the positioning method which is assigned to the determined positioning area.

Also, in addition to the aforementioned configuration described above, the terminal 100 can have a configuration comprising an acknowledging unit 130 which acknowledges a battery remaining amount, and an interconnecting unit 140 which reports the measured position to a subject of the service (not shown in the figures).

For reference, an overall configuration or at least a portion thereof of the terminal 100 including the determining unit 110, the measuring unit 120, the acknowledging unit 130, and the interconnecting unit 140, which are mentioned in the above, can be implemented as a software module (for example: a program, an application) executed by a processor, in a form of a hardware module, or in as a combination of the software module and the hardware module.

As a result, the terminal 100 can minimize the power consumption amount of the terminal 100 and also enhance the accuracy of the position measurement by using the components mentioned above, and the respective components of the terminal 100 for accomplishing this will be explained in detail in the following.

Meanwhile, according to an embodiment of the present invention, it has been also noted that the position measurement of the terminal is performed in a service area (SA).

Here, the service area (SA) includes a plurality of positioning areas to which different positioning methods are assigned, and these service areas will be denoted as a first positioning area (SA1), a second positioning area (SA2), and a third positioning area (SA3) sequentially from an outer side of the service area (SA).

Different positioning methods are assigned to each of the first the positioning area (SA1), the second positioning area (SA2), and the third positioning area (SA3) as a means for considering both the power consumption amount of the terminal 100 for measuring its position and the accuracy required for the position measurement.

Here, as for the first positioning area (SA1), which is located at an outermost side of the service area (SA), it can be estimated that the accuracy required for the position measurement is lower than those required for other positioning areas which are located closer to the center of the service area (SA).

Therefore, a mobile communication cell (Cell) based positioning method, which has a lower position measurement accuracy while it requires a relatively low power consumption amount, can be assigned to the first positioning area (SA1).

Also, as for the second positioning area (SA2), which is located in the middle of the service area (SA), it can be estimated that the accuracy required for the position measurement is somewhat higher than that required for the positioning area which is located at the outermost side of the service area (SA).

Therefore, a short range wireless network (for example: wireless fidelity (WIFI)) based positioning method which has a higher position measurement accuracy and requires a relatively bigger power consumption amount than the mobile communication cell (Cell) based positioning method, can be assigned to the second positioning area (SA2).

And, as for the third positioning area (SA3), which is located in the center of the service area (SA), it can be estimated that the accuracy required for the position measurement is the highest among those required for other positioning areas.

Also, as for the third positioning area (SA3), which is located in the center of the service area (SA), a global positioning system (GPS) based positioning method, which has the highest accuracy required for the position measurement and requires the biggest power consumption amount, can be assigned to the third positioning area (SA3).

As a result, the respective components of the terminal 100 will be explained in the following based on the assumption that the mobile communication cell (Cell) based positioning method, the short range wireless network (for example: WIFI) based positioning method, and the GPS based positioning method are sequentially assigned to the first the positioning area (SA1), the second positioning area (SA2), and the third positioning area (SA3) which are defined in the service area (SA).

The discriminating unit 110 performs a function of determining the positioning area to which the terminal 100 belongs.

More specifically, when the position measurement with respect to the terminal 100 is required in relation to the position based service, the determining unit 110 comes to determine the specific positioning area, to which the terminal 100 belongs, among the first the positioning area (SA1), the second positioning area (SA2), and the third positioning area (SA3) to which different positioning methods are assigned.

In the meantime, in order the determining the specific positioning area to which the terminal 100 belongs, the determining unit 110 enables the measuring unit 120 to acknowledge the position of the terminal 100 within the service area (SA) at the time when the position measurement is required.

Here, the operation of determining the specific positioning area to which the terminal 100 belongs is repeated whenever the position measurement with respect to the terminal 100 is required.

Therefore, when the position measurement is required, the determining unit 110 comes to enable the measuring unit 120 to measure the position of the terminal 100 within the service area (SA) by using, for example, the mobile communication cell (Cell) based positioning method, which has a low position measurement accuracy while requiring a relatively low power consumption amount, in order to minimize the battery consumption of the terminal 100.

As a result, when the position of the terminal 100 within the service area (SA) is measured by using the measuring unit 120, the determining unit 110 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

Here, when the operations performed by the determining unit 110 are summarized, they can be classified into a time instant acknowledging operation which acknowledges the time instant when the position measurement is required, a control operation which allows the measuring unit 120 to perform the position measurement, and a determining operation which determines the positioning area to which the terminal 100 belongs.

Therefore, the configuration of the determining unit 110 can have a form including the respective modules for performing the operations which are classified as in the above.

Figure 3:
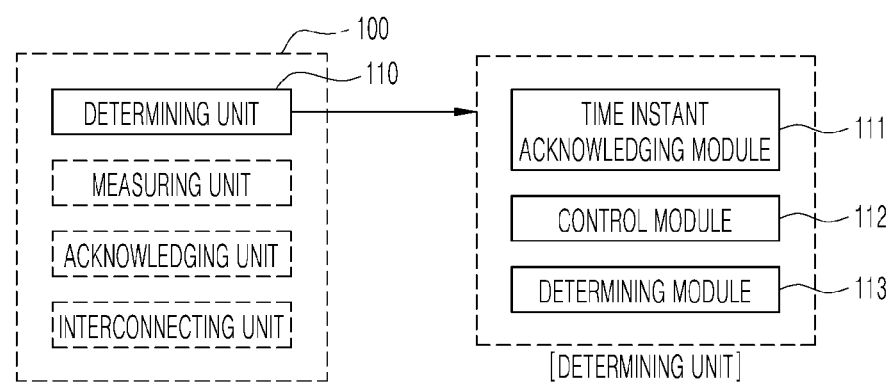
FIG. 3 is a schematic configuration diagram of a determining unit according to an embodiment of the present invention.

That is, as shown in FIG. 3, the determining unit 110 can have the configuration including a time instant acknowledging module 110 which acknowledges the time instant when the position measurement is required, a control module 120 which allows the measuring unit 120 to perform the position measurement, and a determining module 130 which determines the positioning area.

The measuring unit 120 comes to perform a function of measuring the position of the terminal 100.

More specifically, when the positioning area to which the terminal 100 belongs is determined at the time instant when the position measurement is required, the measuring unit 120 comes to measure the position of the terminal 100 by using the positioning method which is assigned to the determined positioning area.

In the meantime, when the positioning area to which the terminal 100 belongs is the first positioning area (SA1), the measuring unit 120 comes to measure the position of the terminal 100 by using the mobile communication cell (Cell) based positioning method which has a lower position measurement accuracy while it requires a relatively low power consumption amount.

When the positioning area to which the terminal 100 belongs is the second positioning area (SA2), the measuring unit 120 comes to measure the position of the terminal 100 by using the short range wireless network (for example: WIFI) based positioning method which has a higher position measurement accuracy and requires a relatively bigger power consumption amount than the mobile communication cell (Cell) based positioning method.

Lastly, when the positioning area to which the terminal 100 belongs is the third positioning area (SA3), the measuring unit 120 comes to measure the position of the terminal 100 by using the GPS based positioning method which has the highest accuracy required for the position measurement as well as the biggest power consumption amount.

Meanwhile, the acknowledging unit 130 acknowledges the battery remaining amount of the terminal 100 prior to performing the position measurement at the measuring unit 120, and the acknowledging unit 130 enables the measuring unit 120 to perform the position measurement according to the positioning method assigned to the positioning area only when the acknowledged battery remaining amount is greater than a threshold value, that is, only when the battery remaining amount is sufficient.

When the acknowledged battery remaining amount is smaller than the threshold value, the acknowledging unit 130 enables the measuring unit 120 to measure the position by using the mobile communication cell (Cell) based positioning method, which requires the smallest power consumption amount, irrespective of the positioning method which is assigned to the positioning area, such that battery depletion is prevented and continuity of the position based service is guaranteed.

As a result, since the measuring unit 120 selects different positioning methods with different position measurement accuracies and power consumption amounts according to the positioning area to which the terminal 100 belongs at the time instant when the position measurement is required, and measures the position of the terminal 100 by using the selected positioning method, the power consumption amount of the terminal 100 required for the position measurement can be minimized and the accuracy of the position measurement can be also improved.

The interconnecting unit 140 performs a function of reporting the position of the terminal 100.

More specifically, when the position measurement for the terminal 100 is completed, the interconnecting unit 140 reports the measured position of the terminal 100 to the subject of the service (not shown in the figures), such that the position based service can be received from the subject of the service.

Meanwhile, it is to be noted that the components of the terminal 100 described above can be implemented as a software module or a hardware module which is executed by a processor, or as a combination of the software module and the hardware module.

Likewise, the software module, the hardware module, or the combination of the software module and the hardware module can be implemented as a hardware system (for example, a computer system).

Therefore, the hardware system for implementing the terminal 100 according to an embodiment of the present invention will be described in the following. It is to be noted that the description herein is a mere example for implementing the components in the aforementioned terminal 100 explained related to the computer system, and that it is possible that the operations thereof can be different from an actual system.

Figure 4:
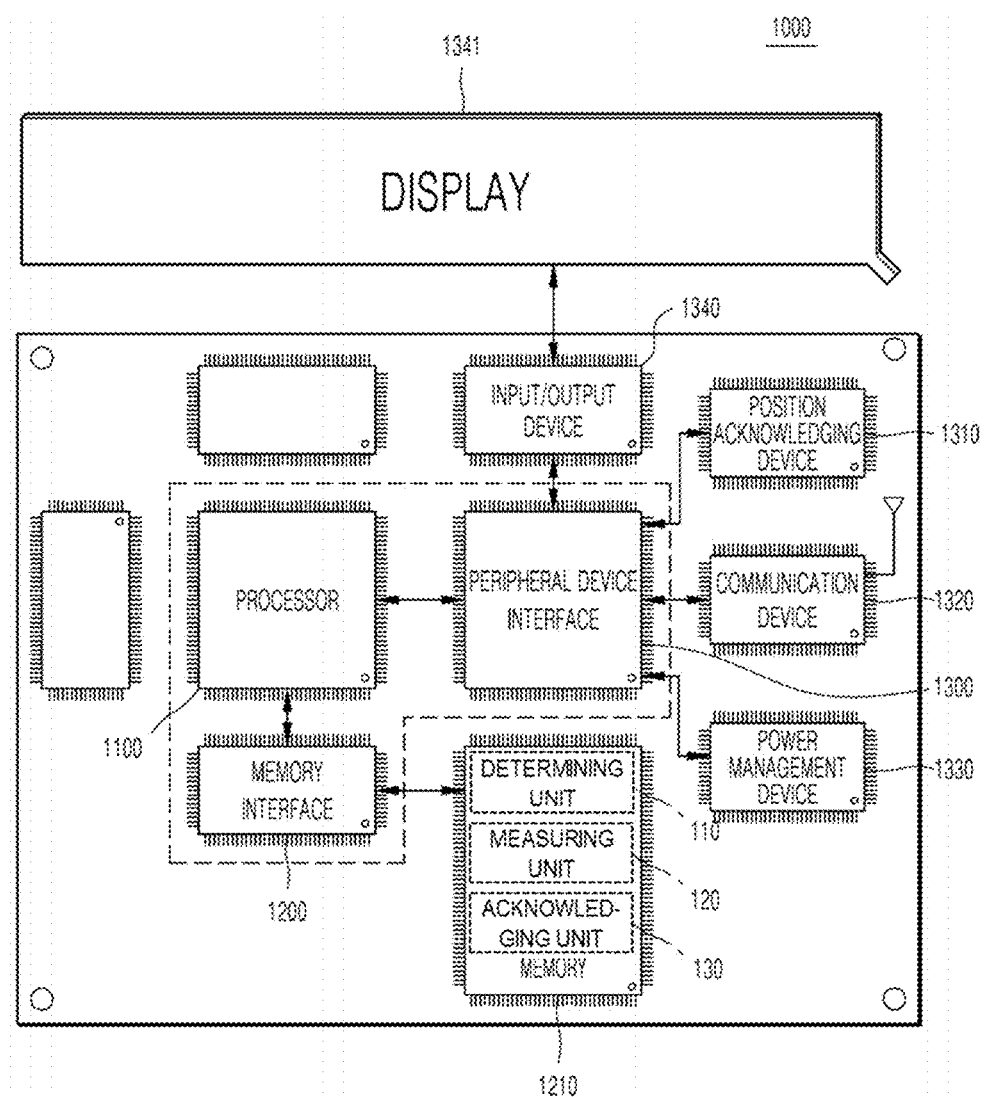
FIG. 4 is a schematic configuration of a hardware system according to an embodiment of the present invention.

FIG. 4 is a diagram showing a configuration of a hardware service system for implementing the terminal 100 according to an embodiment of the present invention.

As shown in FIG. 4, the hardware system 1000 according to an embodiment of the present invention can have a configuration including a processor 1100, a memory interface 1200, and a peripheral interface 1300.

These inner components of the hardware system 1000 can be separate components or integrated in at least one integrated circuit, and these components can be coupled with a bus system (not shown).

Here, the bus system is the abstraction representing adequate bridges, adaptors, and/or arbitrary one or more separate physical bus connected via a controller, communication lines/interfaces, and/or multi-drop or point-to-point connections.

The processor 1100 can execute various software modules included in a memory 1210 by communicating with the memory 1210 via the memory interface 1200 to enable the hardware system to perform various functions.

Here, the determining unit 110, the measuring unit 120, the acknowledging unit 130, and the interconnecting unit 140, which are described as main components of the terminal 100 by referring to FIG. 2, can be stored as software modules in the memory 1210, and an operation system (OS; 150) can be additionally stored in the memory.

As for the operation system (for example, I-OS, Android, Darwin, RTXC, LINUX, UNIX, OS X, WINDOWS, or an embedded operation system such as VxWorks) includes various procedures, command sets, software components and/or drivers which control and manage normal system tasks (for example, memory management, storage device control, power management, etc.), and serves to facilitate the communication among various hardware modules and software modules.

For reference, the memory 1210 can include a memory hierarchical structure including but not limited to a cache, a main memory, and a secondary memory, and the memory hierarchical structure can be implemented through an arbitrary combination of a random access memory (RAM) (for example, a static random access memory (SRAM), a dynamic random access memory (DRAM), a display dynamic random access memory (DDRAM)), a read only memory (ROM), a FLASH memory, a magnetic and/or optical storage device (for example, a disk drive, a magnetic tape, a compact disk (CD) and a digital video disc (DVD), etc.).

The peripheral device interface 1300 serves to facilitate the communication between the processor 1100 and peripheral devices.

As for the peripheral device, it is for providing different functionalities to the computer system and can include, for example, a position acknowledging device, a communication device 1320, a power management device 1330, and an input/output device 1340 according to an embodiment of the present invention.

Here, the position acknowledging device 1310 refer to, for example, a position sensor, a global positioning system (GPS) for providing different position data such as latitude, longitude, and altitude can be applied to the position acknowledging device.

Also the communication device 1320 serves to provide the communication functionality with other devices, includes but is not limited to, for example, an antenna system, a radio frequency (RF) transceiver, at least one amplifier, a tuner, at least one oscillator, a digital signal processor, a CODEC chipset, a memory, etc., and can include a known circuitry for performing these functionalities.

The communication protocol which is supported by the communication device 1320 includes, for example, long term evolution (LTE), time division multiple access (TDMA), code division multiple access (CDMA), global system for mobile communications (GSM), enhanced data GSM environment (EDGE), wideband code division multiple access (W-CDMA), Wi-Fi (IEEE 802.11a, IEEE 802.11b, IEEE 802.11g and/or IEEE 802.11n, etc.), bluetooth, Wi-MAX, voice over Internet protocol (VoIP), and protocols for email, instant messaging, and a short message service (SMS), and protocols, which are not limited to these and provide a communication environment with other devices, can also be included in the communication protocol.

Also, the power management device 1330 manages an operation power source of the hardware system, and as a battery is applied as the operation power source to an embodiment of the present invention, the power management device 1330 comes to acknowledge the remaining amount of the battery.

Also, the input/output 1340 can serve as a controller for controlling an I/O device which is interlinked with the rest hardware systems, and, for example, it can serve to control a display 1321 which can display various service screens, according to an embodiment of the present invention.

As a result, the inner components of the terminal 100, which are stored as software modules in the memory 1210, communicate with the position acknowledging device 1310, the communication device 1320, and the power management device 1330 by way of the memory interface 1200 and the peripheral device interface 1300, when executed by the processor 1100, such that the power consumption amount for measuring positions can be minimized and the accuracy of position measurement can be improved at the same time.

In the following, the inner components of the hardware system 1000, which perform the position measurement, are explained in detail by referring to FIG. 4, and it is assumed to explain in a more convenient way that the inner components of the terminal 100, which are stored in the memory 1210 as software modules, have been executed by the processor 1100 by way of the memory interface 1200.

The discriminating unit 110 performs a function of determining the positioning area to which the terminal 100 belongs by way of the communication device 1320.

More specifically, when the position measurement with respect to the terminal 100 is required in relation to the position based service, the determining unit 110 comes to determine the specific positioning area, to which the terminal 100 belongs, among the first the positioning area (SA1), the second positioning area (SA2), and the third positioning area (SA3) to which different positioning methods are assigned.

Therefore, the determining unit 120 comes to measure the position of the terminal 100 within the service area (SA) by using, for example, the mobile communication cell (Cell) based positioning method, which has a low position measurement accuracy while requiring a relatively low power consumption amount, in order to minimize the battery consumption of the terminal 100.

As a result, the measuring unit 120 comes to measure the position of the terminal 100 within the service area (SA) by means of the mobile communication cell (Cell) based positioning method by operating the communication device 1320 in the hardware system 1000 by way of the memory interface 1200 and the peripheral device interface 1300.

By doing so, when the position of the terminal 100 within the service area (SA) is measured by using the measuring unit 120, the determining unit 110 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

The measuring unit 120 comes to perform the function of measuring the position of the terminal 100 by using the position acknowledging device 1310 or the communication device 1320.

More specifically, when the positioning area to which the terminal 100 belongs is determined at the time instant when the position measurement is required, the measuring unit 120 comes to measure the position of the terminal 100 by using the positioning method which is assigned to the determined positioning area.

In the meantime, when the positioning area to which the terminal 100 belongs is the first positioning area (SA1), the measuring unit 120 comes to drive the communication device 1320 within the hardware system 1000 by way of the memory interface 1200 and the peripheral device interface 1300, thereby measuring the position of the terminal 100 by using the mobile communication cell (Cell) based positioning method which has a lower position measurement accuracy while it requires a relatively low power consumption amount.

When, the positioning area to which the terminal 100 belongs is the second positioning area (SA2), the measuring unit 120 comes to drive the communication device 1320 within the hardware system 1000 by way of the memory interface 1200 and the peripheral device interface 1300, thereby measuring the position of the terminal 100 by using the short range wireless network (for example: WIFI) based positioning method which has a higher position measurement accuracy and a somewhat bigger power consumption amount than the mobile communication cell (Cell) based positioning method.

Lastly, when the positioning area to which the terminal 100 belongs is the third positioning area (SA3), the measuring unit 120 comes to drive the position acknowledging device 1310 within the hardware system 1000 by way of the memory interface 1200 and the peripheral device interface 1300, thereby measuring the position of the terminal 100 by using the GPS based positioning method which has the highest position measurement accuracy and the biggest power consumption amount among the positioning methods.

Meanwhile, the acknowledging unit 130 acknowledges the battery remaining amount of the terminal 100 prior to performing the position measurement at the measuring unit 120, and the acknowledging unit 130 enables the measuring unit 120 to perform the position measurement according to the positioning method assigned to the positioning area only when the acknowledged battery remaining amount is greater than a threshold value, that is, only when the battery remaining amount is sufficient.

As a result, by driving the power management device 1330 in the hardware system 1000 by using the memory interface 1200 and the peripheral interface 1300, the battery remaining amount can be acknowledged.

When the acknowledged battery remaining amount is smaller than the threshold value, the acknowledging unit 130 enables the measuring unit 120 to measure the position by using the mobile communication cell (Cell) based positioning method, which requires the smallest power consumption amount, irrespective of the positioning method which is assigned to the positioning area, such that battery depletion is prevented and continuity of the position based service is guaranteed.

As a result, since the measuring unit 120 selects different positioning methods with different position measurement accuracies and power consumption amounts according to the positioning area to which the terminal 100 belongs at the time instant when the position measurement is required, and measures the position of the terminal 100 by using the selected positioning method, the power consumption amount of the terminal 100 required for the position measurement can be minimized and the accuracy of the position measurement can be also improved.

The interconnecting unit 140 performs a function of reporting the position of the terminal 100 by way of the communication device 1320.

More specifically, when the position measurement for the terminal 100 is completed, the interconnecting unit 140 reports the measured position of the terminal 100 to the subject of the service (not shown in the figures), such that the position based service can be received from the subject of the service.

That is, the interconnecting unit 140 drives the communication device 1320 within the hardware system 1000 by using the memory interface 1200 and the peripheral device interface 1300, thereby reporting the measured position of the terminal 100 to a subject of the service (not shown in the figures).

As described in the above, according to the terminal 100 of an embodiment of the present invention and the hardware system 1000 for implementing the embodiment, a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement can be minimized and the accuracy of the position measurement can also be improved at the same time.

Figure 5:
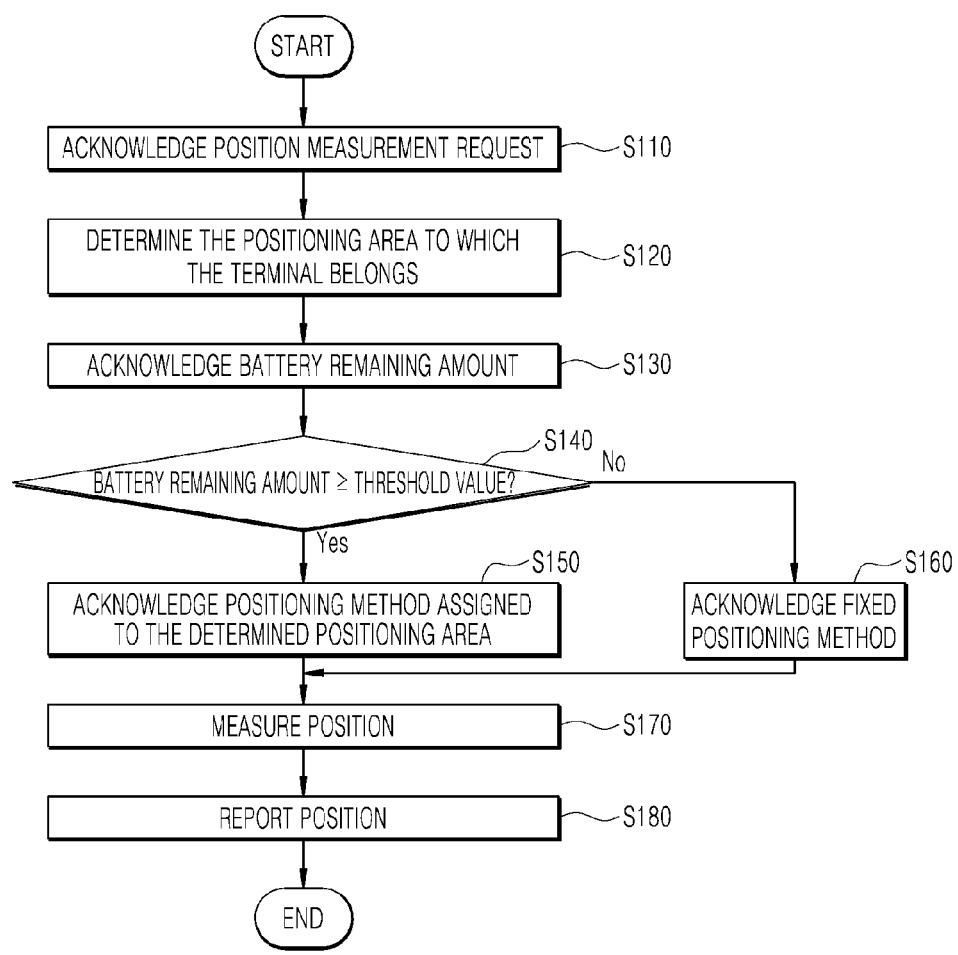
FIG. 5 is a flowchart for illustrating an operation flow of the terminal according to an embodiment of the present invention.
Figure 6:
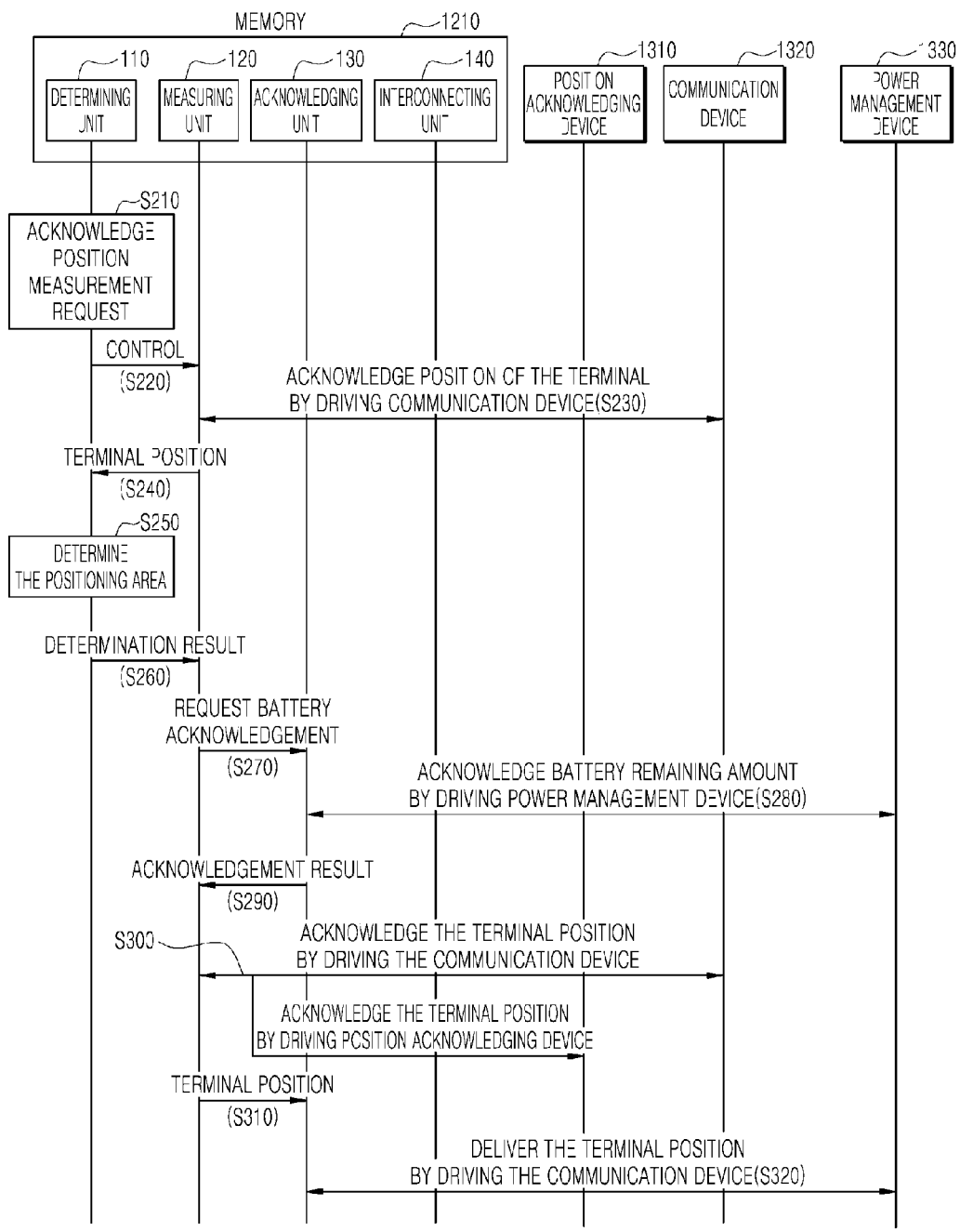
FIG. 6 is a flowchart for illustrating an operation flow of the hardware system according to an embodiment of the present invention.

In the following, a position positioning method according to an embodiment of the present invention will be explained by referring to FIG. 5 and FIG. 6, and, for the convenience of explanation, the components shown in FIGS. 1-4 are referred to by using corresponding reference numbers.

In the following, the operation flow of the terminal 100 according to an embodiment of the present invention will be explained by referring to FIG. 5 as follows.

At first, when the position measurement with respect to the terminal 100 is required in relation to the position based service, the determining unit 110 comes to determine the specific positioning area, to which the terminal 100 belongs, among the first the positioning area (SA1), the second positioning area (SA2), and the third positioning area (SA3) to which different positioning methods are assigned (S110-S120).

In the meantime, in order the determining the specific positioning area to which the terminal 100 belongs, the determining unit 110 enables the measuring unit 120 to acknowledge the position of the terminal 100 within the service area (SA) at the time when the position measurement is required.

Here, the operation of determining the specific positioning area to which the terminal 100 belongs is repeated whenever the position measurement with respect to the terminal 100 is required, and the measuring unit 120 comes to measure the position of the terminal 100 within the service area (SA) by using, for example, the mobile communication cell (Cell) based positioning method, which has a low position measurement accuracy while requiring a relatively low power consumption amount, in order to minimize the battery consumption of the terminal 100.

As a result, when the position of the terminal 100 within the service area (SA) is measured by using the measuring unit 120, the determining unit 110 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

Meanwhile, the acknowledging unit 130 acknowledges the battery remaining amount of the terminal 100 prior to performing the position measurement at the measuring unit 120, and the acknowledging unit 130 enables the measuring unit 120 to perform the position measurement according to the positioning method assigned to the positioning area only when the acknowledged battery remaining amount is greater than a threshold value, that is, only when the battery remaining amount is sufficient (S130).

When the acknowledged battery remaining amount is smaller than the threshold value, the acknowledging unit 130 enables the measuring unit 120 to measure the position by using the mobile communication cell (Cell) based positioning method, which requires the smallest power consumption amount, irrespective of the positioning method which is assigned to the positioning area, such that battery depletion is prevented and continuity of the position based service is guaranteed.

After doing so, the measuring unit 120 measures the position of the terminal 100 by using the positioning method assigned to a determined positioning area, when, in the aforementioned steps S120 and S130, the positioning area to which the terminal 100 belongs is determined at the time instant when the position measurement is required, and it is acknowledged that the battery remaining amount is greater than or equal to a threshold value (S140-S150, S170).

In the meantime, when the positioning area to which the terminal 100 belongs is the first positioning area (SA1), the measuring unit 120 comes to measure the position of the terminal 100 by using the mobile communication cell (Cell) based positioning method which has a lower position measurement accuracy while it requires a relatively low power consumption amount.

When the positioning area to which the terminal 100 belongs is the second positioning area (SA2), the measuring unit 120 comes to measure the position of the terminal 100 by using the short range wireless network (for example: WIFI) based positioning method which has a higher position measurement accuracy and requires a relatively bigger power consumption amount than the mobile communication cell (Cell) based positioning method.

Lastly, when the positioning area to which the terminal 100 belongs is the third positioning area (SA3), the measuring unit 120 comes to measure the position of the terminal 100 by using the GPS based positioning method which has the highest accuracy required for the position measurement as well as the biggest power consumption amount.

As a result, since the measuring unit 120 selects different positioning methods with different position measurement accuracies and power consumption amounts according to the positioning area to which the terminal 100 belongs at the time instant when the position measurement is required, and measures the position of the terminal 100 by using the selected positioning method, the power consumption amount of the terminal 100 required for the position measurement can be minimized and the accuracy of the position measurement can be also improved.

On the other hand, the measuring unit 120 measures the position by using the mobile communication cell (Cell) based positioning method, which requires the smallest power consumption amount, irrespective of the positioning method assigned to the positioning area, when, in the aforementioned steps S120 and S130, the positioning area to which the terminal 100 belongs is determined at the time instant when the position measurement is required, and it is acknowledged that the battery remaining amount is smaller than the threshold value (S140-S150, S170).

After doing so, when the position measurement for the terminal 100 is completed, the interconnecting unit 140 reports the measured position of the terminal 100 to the subject of the service (not shown in the figures), such that the position based service can be received from the subject of the service (S180).

In the following, the operation flow of the inner components of the hardware system 1000, which perform the position measurement according to an embodiment of the present invention, will be explained in detail by referring to FIG. 6, and it is assumed to explain in a more convenient way that the inner components of the navigation server 100, which are stored in the memory 1210 as software modules, have been executed by the processor 1100 by way of the memory interface 1200.

At first, when the position measurement with respect to the terminal 100 is required in relation to the position based service, the determining unit 110 comes to determine the specific positioning area, to which the terminal 100 belongs, among the first the positioning area (SA1), the second positioning area (SA2), and the third positioning area (SA3) to which different positioning methods are assigned (S210-S250).

In the meantime, the measuring unit 120 comes to measure the position of the terminal 100 within the service area (SA) by means of the mobile communication cell (Cell) based positioning method by operating the communication device 1320 in the hardware system 1000 by way of the memory interface 1200 and the peripheral device interface 1300.

Here, the operation of determining the specific positioning area to which the terminal 100 belongs is repeated whenever the position measurement with respect to the terminal 100 is required.

Here, the determining unit 120 comes to measure the position of the terminal 100 within the service area (SA) by using, for example, the mobile communication cell (Cell) based positioning method, which has a low position measurement accuracy while requiring a relatively low power consumption amount, in order to minimize the battery consumption of the terminal 100.

As a result, when the position of the terminal 100 within the service area (SA) is measured by using the measuring unit 120, the determining unit 110 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

Then, when a positioning area determining result is received from the determining unit 110, the measuring unit 120, prior to the position measurement, allows the acknowledging unit 130 to acknowledge the remaining amount of the battery of the terminal 100 (S260-S280).

As a result, by driving the power management device 1330 in the hardware system 1000 by using the memory interface 1200 and the peripheral interface 1300, the battery remaining amount comes to be acknowledged.

Then, the acknowledging unit 130 delivers an acknowledgement result of the battery remaining amount to the measuring unit 120, such that the position measurement is performed according to the battery remaining amount which is acknowledged by the measuring unit 120 (S290).

In the meantime, the acknowledging unit 230 enables the measuring unit 120 to perform the position measurement according to the positioning method assigned to the positioning area, only when the acknowledged battery remaining amount is greater than or equal to the threshold value, that is the battery remaining amount is sufficient, and when the acknowledged battery remaining amount is smaller than the threshold value, the acknowledging unit 230 enables the measuring unit 120 to measure the position by using the mobile communication cell (Cell) based positioning method, which requires the smallest power consumption amount, irrespective of the positioning method which is assigned to the positioning area, such that battery depletion is prevented and continuity of the position based service is guaranteed.

After doing so, the measuring unit 120 measures the position of the terminal 100 by using the positioning method assigned to a determined positioning area, when the positioning area to which the terminal 100 belongs is determined at the time instant when the position measurement is required, and it is acknowledged that the battery remaining amount is greater than or equal to a threshold value (S300).

In the meantime, when the positioning area to which the terminal 100 belongs is the first positioning area (SA1), the measuring unit 120 comes to measure the position of the terminal 100 by using the mobile communication cell (Cell) based positioning method which has a lower position measurement accuracy while it requires a relatively low power consumption amount.

In order to accomplish this, the measuring unit 120 comes to measure the position of the terminal 100 by means of the mobile communication cell (Cell) based positioning method by operating the communication device 1320 in the hardware system 1000 by way of the memory interface 1200 and the peripheral device interface 1300.

When the positioning area to which the terminal 100 belongs is the second positioning area (SA2), the measuring unit 120 comes to measure the position of the terminal 100 by using the short range wireless network (for example: WIFI) based positioning method which has a higher position measurement accuracy and requires a relatively bigger power consumption amount than the mobile communication cell (Cell) based positioning method.

In order to accomplish this, as in the case of the mobile communication cell (Cell) based positioning method, the measuring unit 120 comes to measure the position of the terminal 100 by means of the short range wireless network (for example: WIFI) based positioning method by operating the communication device 1320 in the hardware system 1000 by way of the memory interface 1200 and the peripheral device interface 1300.

Lastly, when the positioning area to which the terminal 100 belongs is the third positioning area (SA3), the measuring unit 120 comes to measure the position of the terminal 100 by using the GPS based positioning method which has the highest accuracy required for the position measurement as well as the biggest power consumption amount.

In order to accomplish this, the measuring unit 120 comes to measure the position of the terminal 100 by means of the GPS based positioning method, which also has the greatest power consumption amount, by operating the position acknowledging device 1310 in the hardware system 1000 by way of the memory interface 1200 and the peripheral device interface 1300.

As a result, since the measuring unit 120 selects different positioning methods with different position measurement accuracies and power consumption amounts according to the positioning area to which the terminal 100 belongs at the time instant when the position measurement is required, and measures the position of the terminal 100 by using the selected positioning method, the power consumption amount of the terminal 100 required for the position measurement can be minimized and the accuracy of the position measurement can be also improved.

Meanwhile, the measuring unit 120 comes to measure the position by using the mobile communication cell (Cell) based positioning method, which requires the smallest power consumption amount, irrespective of the positioning method assigned to the positioning area, when the positioning area to which the terminal 100 belongs is determined at the time instant when the position measurement is required, and it is acknowledged that the battery remaining amount is smaller than the threshold value.

Also, the measuring unit 120 comes to measure the position of the terminal 100 by means of the mobile communication cell (Cell) based positioning method by operating the communication device 1320 in the hardware system 1000 by way of the memory interface 1200 and the peripheral device interface 1300.

After doing so, when the position measurement for the terminal 100 is completed and the measured result is received from the measuring unit 120, the interconnecting unit 140 reports the measured position of the terminal 100 to the subject of the service (not shown in the figures), such that the position based service can be received from the subject of the service (S310-S320).

In the meantime, the interconnecting unit 140 drives the communication device 1320 within the hardware system 1000 by using the memory interface 1200 and the peripheral device interface 1300, thereby reporting (transmitting) the measured position of the terminal 100 to a subject of the service (not shown in the figures).

As described in the above, according to the operation flow of the terminal 100 of an embodiment of the present invention and the hardware system 1000 for implementing the embodiment, a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement can be minimized and the accuracy of the position measurement can also be improved at the same time.

In the following, another embodiment of the present invention will be explained.

Figure 7:
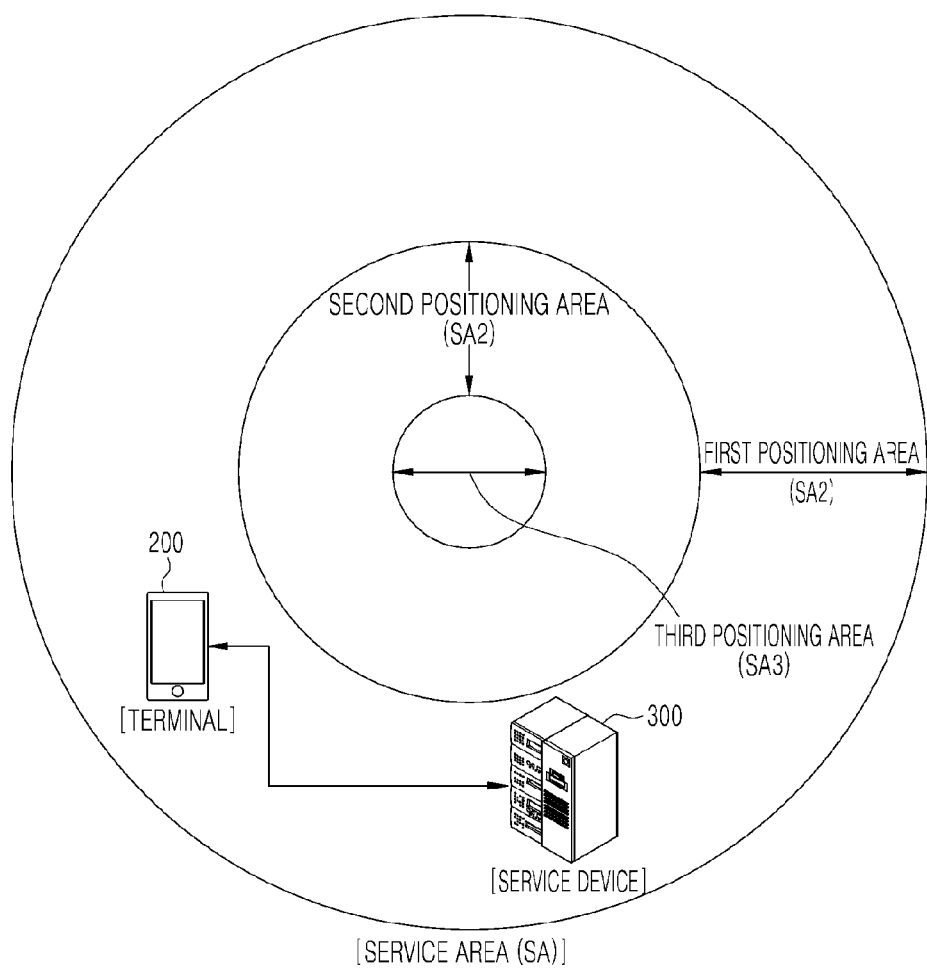
FIG. 7 is a schematic configuration diagram of a position based service environment according to another embodiment of the present invention.

FIG. 7 is a diagram which shows a service environment in which the position measurement according to another embodiment of the present invention is performed.

As shown in FIG. 7, service areas (SA) in which the position based service can be utilized, a terminal 200 which measures its position within the service areas (SA), and a service device 300 which controls a position measuring operation performed in the terminal 200 can be included in the position based service environment according to an embodiment of the present invention.

The service areas (SA) refer to an area in which a user carrying the terminal 200 can travel, and the areas are not limited by an area size when electromagnetic signals for the position based service can be received within the service areas.

The terminal 200 refers to a device which, when position acknowledgement is required in relation to the position based service, measures its position within the service area (SA) and delivers the acknowledged position to a service device 300 which is the subject of the service.

For example, a mobile device including a smart phone, a tablet personal computer (PC), a personal digital assistant (PDA), and a notebook, etc. can be the terminal 200;

however, the terminal 100 is not limited to these examples and all devices capable of position measurement can be included in the terminal.

The service device 300 refers to a server which provides the position based service to the terminal 200, and the position based service provided to the terminal 200 can include, for example, a weather service, a navigation service, an advertisement service, etc., while the position based service is not limited to these examples and all services, which can utilize the position information of the terminal 200, can be included in the position based service.

Meanwhile, according to another embodiment of the present invention, the terminal 200 measures its position within a service area (SA), delivers the measured position to the service device 300, and then comes to receive the position based service.

As mentioned in the background of the invention section and for an embodiment of the present invention, the position based service can be realized, for example, by enabling a service client, which operates in the background of the terminal in a form of a program or an application, to measure the position of the terminal at a preset period or when necessary, and report the measured position to a subject of the service.

Like this, the most important factor for the service, which is provided by acknowledging the position of the terminal 200, is to acknowledge an accurate position of the terminal 200, and, in order to accomplish this, the terminal 200 is required to acknowledge its position at a short period and report the acknowledged position to the subject of the service.

Like this, although the procedure in which the terminal 200 reports the position information can be performed by the terminal 200 itself without an intervention from the service device 300, it is assumed that the service device 300 requests the acknowledgement and the report of the position information from the terminal 200 whenever the predetermined period arrives.

By the way, when the terminal 100 acknowledges its position and reports the acknowledged position at a short period according to the request from the service device 300 as described in the above, the accuracy of the position based service is improved; however, it has a drawback that the battery consumption of the terminal 100 can be accelerated.

As a result, in order to provide a preferable position based service, there is required a new solution which can minimize the power consumption amount required for performing the position measurement of the terminal 200 and also improve the accuracy of the position measurement.

Therefore, another embodiment of the present invention aims at providing a technique which can minimize the power consumption amount required for performing the position measurement of the terminal 200 while improving the accuracy of the position measurement at the same time, and the service device 300, which is provided to realize the embodiment of the present invention, will be explained in detail in the following.

At first, the configuration of the service device 300 according to another embodiment of the present invention will be explained in detail by referring to FIG. 8.

Figure 8:
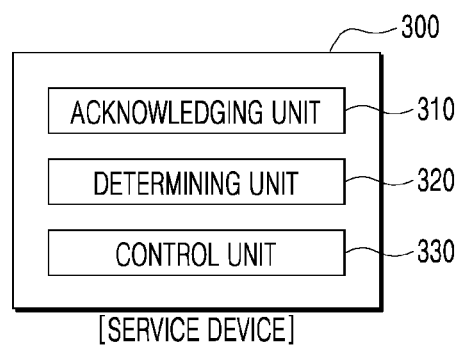
FIG. 8 is a schematic configuration diagram of a service device according to another embodiment of the present invention.

As shown in FIG. 8, the service device 300 according to another embodiment of the present invention can have a configuration comprising an acknowledging unit 310, which acknowledges the position of the terminal 200, a determining unit 320, which determines a positioning area to which the terminal 100 belongs, and a control unit 330 which measures the position of the terminal 200 according to the positioning method which is assigned to the determined positioning area.

For reference, an overall configuration or at least a portion thereof of the service device 300 including the acknowledging unit 310, the determining unit 320, and the control unit 330, which are mentioned in the above, can be implemented as a software module (for example: a program, an application) executed by a processor, in a form of a hardware module, or in as a combination of the software module and the hardware module.

As a result, the service device 300 according to another embodiment of the present invention can minimize the power consumption amount of the terminal 200 and also enhance the accuracy of the position measurement by using the components mentioned above, and the respective components of the service device 300 for accomplishing this will be explained in detail in the following.

Meanwhile, according to another embodiment of the present invention, it has been also noted that the position measurement of the terminal is performed in a service area (SA).

Here, the service area (SA) includes a plurality of positioning areas to which different positioning methods are assigned, and as in the case of an embodiment of the present invention, these service areas will be denoted as a first positioning area (SA1), a second positioning area (SA2), and a third positioning area (SA3) sequentially from an outer side of the service area (SA).

Different positioning methods are assigned to each of the first the positioning area (SA1), the second positioning area (SA2), and the third positioning area (SA3) as a means for considering both the power consumption amount of the terminal 100 for measuring its position and the accuracy required for the position measurement.

Here, as for the first positioning area (SA1), which is located at an outermost side of the service area (SA), it can be estimated that the accuracy required for the position measurement is lower than those required for other positioning areas which are located closer to the center of the service area (SA).

Therefore, a mobile communication cell (Cell) based positioning method, which has a lower position measurement accuracy while it requires a relatively low power consumption amount, can be assigned to the first positioning area (SA1).

Also, as for the second positioning area (SA2), which is located in the middle of the service area (SA), it can be estimated that the accuracy required for the position measurement is somewhat higher than that required for the positioning area which is located at the outermost side of the service area (SA).

Therefore, a short range wireless network (for example: wireless fidelity (WIFI)) based positioning method which has a higher position measurement accuracy and requires a relatively bigger power consumption amount than the mobile communication cell (Cell) based positioning method, can be assigned to the second positioning area (SA2).

And, as for the third positioning area (SA3), which is located in the center of the service area (SA), it can be estimated that the accuracy required for the position measurement is the highest among those required for other positioning areas.

Also, as for the third positioning area (SA3), which is located in the center of the service area (SA), a global positioning system (GPS) based positioning method, which has the highest accuracy required for the position measurement and requires the biggest power consumption amount, can be assigned to the third positioning area (SA3).

As a result, the respective components will be explained in the following based on the assumption that the mobile communication cell (Cell) based positioning method, the short range wireless network (for example: WIFI) based positioning method, and the GPS based positioning method are sequentially assigned to the first the positioning area (SA1), the second positioning area (SA2), and the third positioning area (SA3) which are defined in the service area (SA).

The acknowledging unit 310 performs a function of acknowledging the position information of the terminal 100.

More specifically, when the position measurement of the terminal 200 is required in relation to the position based service, the acknowledging unit 310 comes to acknowledge the position of the terminal 200 within the service area (SA).

In the meantime, the acknowledging unit 310 can acknowledge the position of the terminal 200 within the service area (SA) by, for example, acknowledging the base station for the mobile communication cell (Cell) with which the terminal 200 is currently connected, or by acknowledging the access point (AP) of the short range wireless network (for example: WIFI).

In addition to these, payment information, which has been used in the terminal 200 at a time instant close to the time instant when the position measurement was required, can be additionally used by the acknowledging unit 310 for acknowledging the position of the terminal 200, and this can be realized by regarding the position of an offline market, where the payment using the terminal 200 was settled, as the position of the terminal 200 within the service area (SA).

The discriminating unit 320 performs a function of determining the positioning area to which the terminal 200 belongs.

More specifically, when the position of the terminal 200 within is acknowledged by the acknowledging unit 310, the determining unit 320 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

The control unit 330 performs a function of realizing the position measurement process for the terminal 200.

More specifically, when the positioning area to which the terminal 200 belongs is determined by the determining unit 320, the control unit 330 delivers a control signal to the terminal 200, such that the terminal 200 measures the position by using the positioning method, which is assigned to the determined positioning area, and reports the measured position.

For example, when the positioning area to which the terminal 100 belongs is the first positioning area (SA1), the measuring unit 120 comes to deliver the control signal to the terminal 200 such that the position is measured by using the mobile communication cell (Cell) based positioning method which has a lower position measurement accuracy while it requires a relatively low power consumption amount.

When the positioning area to which the terminal 100 belongs is the second positioning area (SA2), the measuring unit 120 comes to deliver the control signal to the terminal 200, such that the position is measured by using the short range wireless network (for example: WIFI) based positioning method which has a higher position measurement accuracy and requires a relatively bigger power consumption amount than the mobile communication cell (Cell) based positioning method.

Lastly, when the positioning area to which the terminal 100 belongs is the third positioning area (SA3), the measuring unit 120 comes to deliver the control signal to the terminal 200, such that the position is measured by using the GPS based positioning method which has the highest accuracy required for the position measurement as well as the biggest power consumption amount.

As a result, since the control unit 330 controls the terminal 200 to select different positioning methods with different position measurement accuracies and power consumption amounts according to the positioning area to which the terminal 200 belongs at the time instant when the position measurement is required, and measure the position of the terminal 200 by using the selected positioning method, the power consumption amount of the terminal 200 required for the position measurement can be minimized and the accuracy of the position measurement can be also improved.

Meanwhile, it is to be noted that the components of the service device 300 described above can be implemented as a software module or a hardware module which is executed by a processor, or as a combination of the software module and the hardware module.

Likewise, the software module, the hardware module, or the combination of the software module and the hardware module can be implemented as a hardware system (for example, a computer system).

Therefore, the hardware system for implementing the service device 300 according to another embodiment of the present invention will be described in the following.

It is to be noted that the description herein is a mere example for implementing the components in the aforementioned service device 300 explained related to the computer system, and that it is possible that the operations thereof can be different from an actual system.

Figure 9:
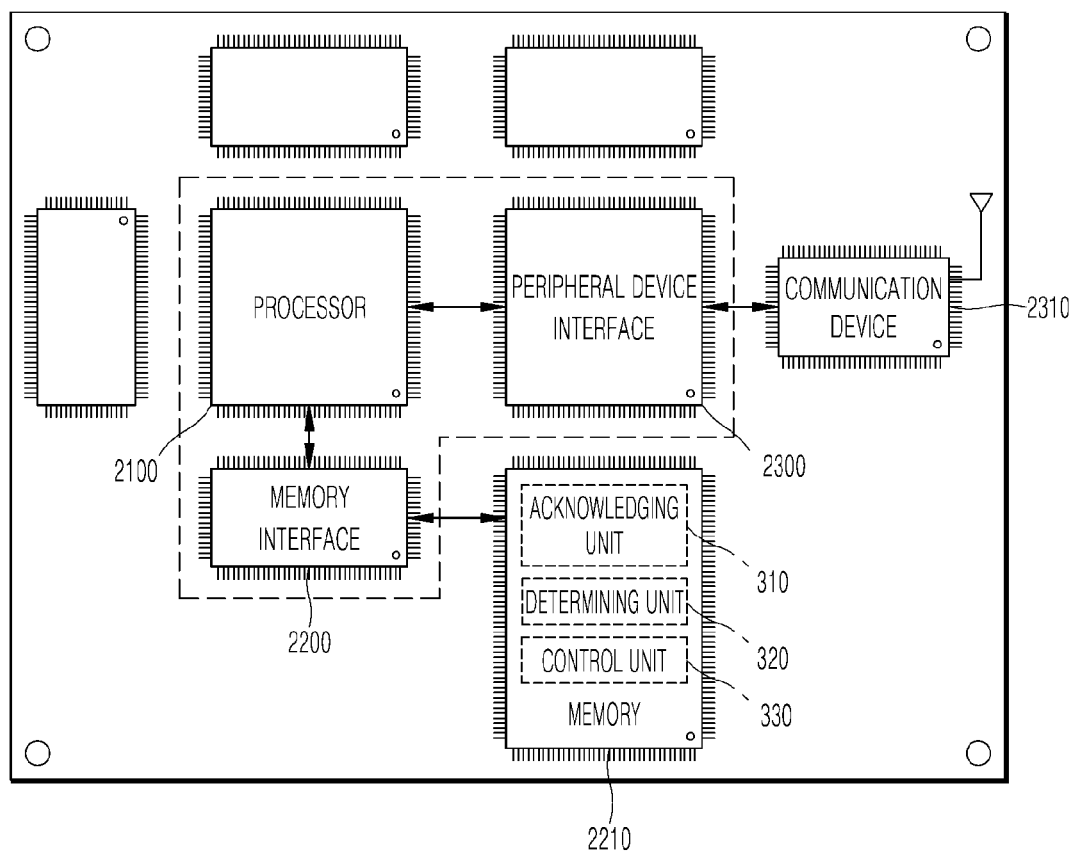
FIG. 9 is a schematic configuration of a hardware system according to another embodiment of the present invention.

FIG. 9 is a diagram showing a configuration of a hardware service system for implementing the service device 300 according to another embodiment of the present invention.

As shown in FIG. 9, the hardware system 2000 according to another embodiment of the present invention can have a configuration including a processor 2100, a memory interface 2200, and a peripheral interface 2300.

These inner components of the hardware system 2000 can be separate components or integrated in at least one integrated circuit, and these components can be coupled with a bus system (not shown).

Here, the bus system is the abstraction representing adequate bridges, adaptors, and/or arbitrary one or more separate physical bus connected via a controller, communication lines/interfaces, and/or multi-drop or point-to-point connections.

The processor 2100 can execute various software modules included in a memory 2210 by communicating with the memory 2210 via the memory interface 2200 to enable the hardware system to perform various functions.

Here, the acknowledging unit 310, the determining unit 320, and the control unit 330, which are described as main components of the service device 300 by referring to FIG. 8, can be stored as software modules in the memory 2210, and an operation system (OS; 150) can be additionally stored in the memory.

As for the above, the operation system (150; for example, I-OS, Android, Darwin, RTXC, LINUX, UNIX, OS X, WINDOWS, or an embedded operation system such as VxWorks) includes various procedures, command sets, software components and/or drivers which control and manage normal system tasks (for example, memory management, storage device control, power management, etc.), and serves to facilitate the communication among various hardware modules and software modules.

For reference, the memory 2210 can include a memory hierarchical structure including but not limited to a cache, a main memory, and a secondary memory, and the memory hierarchical structure can be implemented through an arbitrary combination of a random access memory (RAM) (for example, a static random access memory (SRAM), a dynamic random access memory (DRAM), a display dynamic random access memory (DDRAM)), a read only memory (ROM), a FLASH memory, a magnetic and/or optical storage device (for example, a disk drive, a magnetic tape, a compact disk (CD) and a digital video disc (DVD), etc.).

The peripheral device interface 2300 serves to facilitate the communication between the processor 2100 and peripheral devices.

As for the peripheral device, it is for providing different functionalities to the computer system and can include, for example, a communication device 1320 according to another embodiment of the present invention.

Here, the communication device 2310 serves to provide the communication functionality with other devices, includes but is not limited to, for example, an antenna system, a radio frequency (RF) transceiver, at least one amplifier, a tuner, at least one oscillator, a digital signal processor, a CODEC chipset, a memory, etc., and can include a known circuity for performing these functionalities.

The communication protocol which is supported by the communication device 2310 includes, for example, long term evolution (LTE), time division multiple access (TDMA), code division multiple access (CDMA), global system for mobile communications (GSM), enhanced data GSM environment (EDGE), wideband code division multiple access (W-CDMA), Wi-Fi (IEEE 802.11a, IEEE 802.11b, IEEE 802.11g and/or IEEE 802.11n, etc.), bluetooth, Wi-MAX, voice over Internet protocol (VoIP), and protocols for email, instant messaging, and a short message service (SMS), and protocols, which are not limited to these and provide a communication environment with other devices, can also be included in the communication protocol.

As a result, the inner components of the service device 300, which are stored as software modules in the memory 2210, communicate with the communication device 2310 by way of the memory interface 2200 and the peripheral device interface 2300, when executed by the processor 2100, such that the power consumption amount for measuring positions can be minimized and the accuracy of position measurement can be improved at the same time.

In the following, the inner components of the hardware system 2000 are explained in detail by referring to aforementioned FIG. 9, and it is assumed to explain in a more convenient way that the inner components of the service device 300, which are stored in the memory 2210 as software modules, have been executed by the processor 2100 by way of the memory interface 2200.

The acknowledging unit 310 performs a function of acknowledging the position information of the terminal 100 by way of the communication device 2310.

More specifically, when the position measurement of the terminal 200 is required in relation to the position based service, the acknowledging unit 310 comes to acknowledge the position of the terminal 200 within the service area (SA).

In the meantime, since the acknowledging unit 310 drives the communication device 2310 in the hardware system 2000 by way of the memory interface 2200 and the peripheral device interface 2300, tit can acknowledge the position of the terminal 200 within the service area (SA) by acknowledging the base station for the mobile communication cell (Cell) with which the terminal 200 is currently connected, or by acknowledging the access point (AP) of the short range wireless network (for example: WIFI).

The discriminating unit 320 performs a function of determining the positioning area to which the terminal 200 belongs.

More specifically, when the position of the terminal 200 within is acknowledged by the acknowledging unit 310, the determining unit 320 acknowledges where, among the first the positioning area (SA1), the second positioning area (SA2), and the third positioning area (SA3), the measured position corresponds, such that the positioning area to which the terminal 100 belongs is determined at the time instant when the position measurement is required.

The control unit 330 performs a function of realizing the position measurement process for the terminal 200 by way of the communication device 2310.

More specifically, when the positioning area to which the terminal 200 belongs is determined by the determining unit 320, the control unit 330 delivers a control signal to the terminal 200, such that the terminal 200 measures the position by using the positioning method, which is assigned to the determined positioning area, and reports the measured position.

In the meantime, the control unit 330 comes to deliver the control signal for controlling the position measurement process of the terminal 200 to the terminal 200 by driving the communication device 2310 in the hardware system 2000 by way of the memory interface 2200 and the peripheral device interface 2300.

As described in the above, according to the service device 300 of another embodiment of the present invention and the hardware system 2000 for implementing the embodiment, the control is performs in a way that a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement can be minimized and the accuracy of the position measurement can also be improved at the same time.

Figure 10:
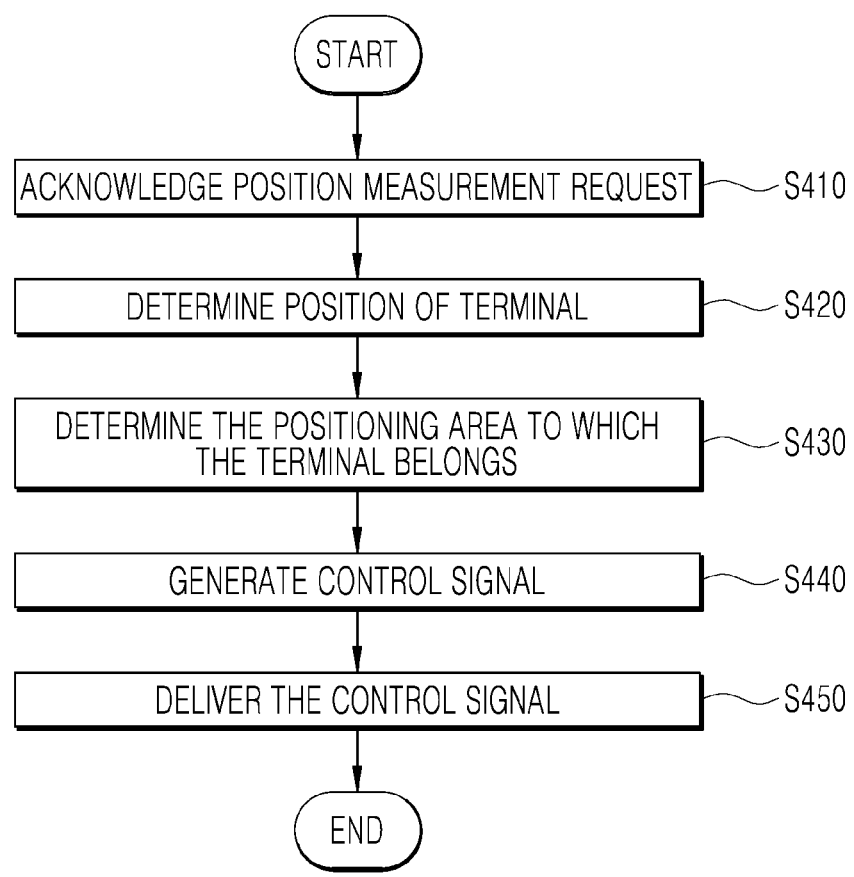
FIG. 10 is a flowchart for illustrating an operation flow of the service device according to another embodiment of the present invention.
Figure 11:
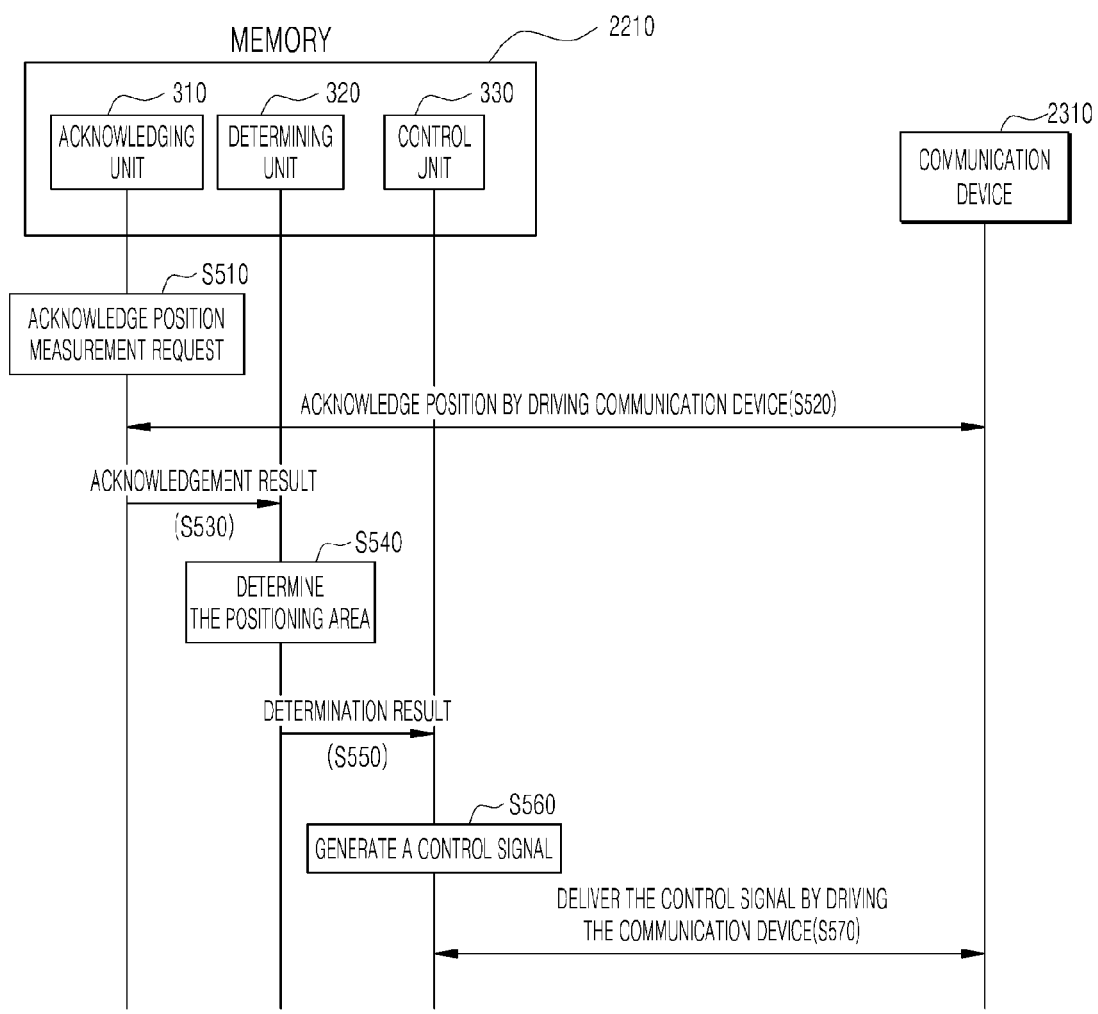
FIG. 11 is a flowchart for illustrating an operation flow of the hardware system according to another embodiment of the present invention.

In the following, a position positioning method according to another embodiment of the present invention will be explained by referring to FIG. 10 and FIG. 11, and, for the convenience of explanation, the components shown in FIGS. 7-9 are referred to by using corresponding reference numbers.

In the following, the operation flow of the service device 300 according to another embodiment of the present invention will be explained by referring to FIG. 10 as follows.

At first, when the position measurement of the terminal 200 is required in relation to the position based service, the acknowledging unit 310 acknowledges the position of the terminal 200 within the service area (S410-S420).

In the meantime, the acknowledging unit 310 can acknowledge the position of the terminal 200 within the service area (SA) by, for example, acknowledging the base station for the mobile communication cell (Cell) with which the terminal 200 is currently connected, or by acknowledging the access point (AP) of the short range wireless network (for example: WIFI).

In addition to these, payment information, which has been used in the terminal 200 at a time instant close to the time instant when the position measurement was required, can be additionally used by the acknowledging unit 310 for acknowledging the position of the terminal 200, and this can be realized by regarding the position of an offline market, where the payment using the terminal 200 was settled, as the position of the terminal 200 within the service area (SA).

After doing so, when the position of the terminal 200 within is acknowledged by the acknowledging unit 310, the determining unit 320 acknowledges where, among the first the positioning area (SA1), the second positioning area (SA2), and the third positioning area (SA3), the measured position corresponds, such that the positioning area to which the terminal 100 belongs is determined at the time instant when the position measurement is required (S430).

After doing so, when the positioning area to which the terminal 200 belongs is determined by the determining unit 320, the control unit 330 generates a control signal and delivers the control signal to the terminal 200, such that the terminal 200 measures the position by using the positioning method, which is assigned to the determined positioning area, and reports the measured position (S440-S450).

For example, when the positioning area to which the terminal 100 belongs is the first positioning area (SA1), the measuring unit 120 comes to deliver the control signal to the terminal 200 such that the position is measured by using the mobile communication cell (Cell) based positioning method which has a lower position measurement accuracy while it requires a relatively low power consumption amount.

When the positioning area to which the terminal 100 belongs is the second positioning area (SA2), the measuring unit 120 comes to deliver the control signal to the terminal 200, such that the position is measured by using the short range wireless network (for example: WIFI) based positioning method which has a higher position measurement accuracy and requires a relatively bigger power consumption amount than the mobile communication cell (Cell) based positioning method.

Lastly, when the positioning area to which the terminal 100 belongs is the third positioning area (SA3), the measuring unit 120 comes to deliver the control signal to the terminal 200, such that the position is measured by using the GPS based positioning method which has the highest accuracy required for the position measurement as well as the biggest power consumption amount.

As a result, since the control unit 330 controls the terminal 200 to select different positioning methods with different position measurement accuracies and power consumption amounts according to the positioning area to which the terminal 200 belongs at the time instant when the position measurement is required, and measure the position of the terminal 200 by using the selected positioning method, the power consumption amount of the terminal 200 required for the position measurement can be minimized and the accuracy of the position measurement can be also improved.

In the following, the operation flow of the inner components of the hardware system 2000 according to another embodiment of the present invention, will be explained in detail by referring to FIG. 11, and it is assumed to explain in a more convenient way that the inner components of the service device 300, which are stored in the memory 2210 as software modules, have been executed by the processor 2100 by way of the memory interface 2200.

At first, when the position measurement of the terminal 200 is required in relation to the position based service, the acknowledging unit 310 acknowledges the position of the terminal 200 within the service area (S510-S520).

In the meantime, since the acknowledging unit 310 drives the communication device 2310 in the hardware system 2000 by way of the memory interface 2200 and the peripheral device interface 2300, tit can acknowledge the position of the terminal 200 within the service area (SA) by acknowledging the base station for the mobile communication cell (Cell) with which the terminal 200 is currently connected, or by acknowledging the access point (AP) of the short range wireless network (for example: WIFI).

After doing so, when an acknowledgement result is received from the acknowledging unit 310, the determining unit 320 acknowledges where, among the first the positioning area (SA1), the second positioning area (SA2), and the third positioning area (SA3), the measured position corresponds, such that the positioning area to which the terminal 100 belongs is determined at the time instant when the position measurement is required (S530-S540).

After doing so, when a positioning area determination result is received from the determining unit 320, the control unit 330 generates a control signal and delivers the control signal to the terminal 200, such that the terminal 200 measures the position by using the positioning method, which is assigned to the determined positioning area, and reports the measured position (S550-S570).

In the meantime, the control unit 330 comes to deliver the control signal for controlling the position measurement process of the terminal 200 to the terminal 200 by driving the communication device 2310 in the hardware system 2000 by way of the memory interface 2200 and the peripheral device interface 2300.

As described in the above, according to the operation flow of the service device 300 of another embodiment of the present invention and the hardware system 2000 for implementing the embodiment, the control is performs in a way that a specific positioning area, to which the terminal belongs, is determined out of two or more positioning areas, to which different positioning methods are assigned, and the position measurement is performed by the terminal according to the positioning method which is assigned to the specific positioning area, such that the power consumption amount of the terminal for performing the position measurement can be minimized and the accuracy of the position measurement can also be improved at the same time.

At this point, a person having ordinary skill in the art will readily understand that the present invention can be practiced in the form of other detailed implementations without varying the technical spirit or essential features of the invention. Therefore, the embodiments which have been described in the above are to be understood to be illustrative and not restrictive examples.

For example, the terminal 100, 200 and the service device 300 according to the present invention can store information on a memory, and, in one implementation, the memory is a computer-readable medium. In one implementation, the memory can be a volatile memory unit, while it can be a non-volatile memory unit in other implementations. Also, the memory can include, for example, a hard disk device, an optical disk, or other types of mass storage devices.

The terminal 100, 200 and the service device 300 can also include, as an external input/output device, at least one network interface device such as an Ethernet card, a serial communication device such as an RS-232 port, and/or a wireless interface device such as an 802.11 card. In other implementations, these input/output devices can include a driver device, which is configured to transmit output data to other input/output devices and receive input data, such as a keyboard, a printer, and a display device, etc.

The terminal 100, 200 and the service device 300 can be operated by instructions which enable, when executed, at least one processing device to perform the aforementioned functions and processes. For example, these instructions can include interpretable instructions such as script instructions like JavaScript or ECMAScript instructions, executable codes, or other instructions stored in a computer-readable medium.

The terminal 100, 200 and the service device 300 according to the present invention can be realized in a distributed form across a network like a server farm, or they can be implemented as a single computer device.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or sub-combinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

What is claimed is:

1. A terminal, the terminal comprising a processor, wherein said processor configured to:
   when a position measurement is required by a subject of a service, determine a positioning area of the terminal among a plurality of positioning areas, wherein each of the plurality of positioning areas is assigned to a corresponding positioning method among a plurality of different positioning methods; and perform the position measurement of the terminal using the positioning method assigned to the determined positioning area of the terminal, wherein the position measurement is periodically required and the performed position measurement of the terminal is reported to the subject of the service, wherein the plurality of different positioning methods is assigned to the plurality of positioning areas based on at least one of a power consumption amount of the terminal required for the position measurement and an accuracy required for the position measurement, wherein the processor is configured to perform the position measurement of the terminal based on a battery remaining amount of the terminal, and wherein when the battery remaining amount is smaller than a threshold value, the processor is configured to perform the position measurement of the terminal according to a specific positioning method, which consumes a smallest power consumption amount, among the plurality of different positioning methods.

2. The terminal according to claim 1, wherein when the battery remaining amount of the terminal is greater than or equal to the threshold value, the processor is configured to perform the position measurement of the terminal according to the assigned positioning method which is assigned to the determined positioning area.

3. An operating method of a terminal, the operating method comprising:

determining, when a position measurement is required by a subject of a service, a positioning area of the terminal among a plurality of positioning areas, wherein each of the plurality of positioning areas is assigned to a corresponding positioning method among a plurality of different positioning methods; and performing the position measurement of the terminal using the positioning method assigned to the determined positioning area of the terminal, wherein the position measurement is periodically required and the performed position measurement of the terminal is reported to the subject of the service wherein the plurality of different positioning methods is assigned to the plurality of positioning areas based on at least one of a power consumption amount of the terminal required for the position measurement and the accuracy required for the position measurement, wherein the position measurement of the terminal is performed based on a battery remaining amount of the terminal, and wherein when the battery remaining amount is smaller than a threshold value, the position measurement of the terminal is performed according to a specific positioning method, which consumes a smallest power consumption amount, among the plurality of different positioning methods.

4. The operating method of a terminal according to claim 3, wherein when the battery remaining amount of the terminal is greater than or equal to the threshold value, the performing the position measurement of the terminal is performed according to the assigned positioning method which is assigned to the determined positioning area.

* * * * *